Nov. 19, 1940.  H. M. PFLAGER  2,222,321
RAILWAY TRUCK
Filed Oct. 15, 1938  2 Sheets-Sheet 1
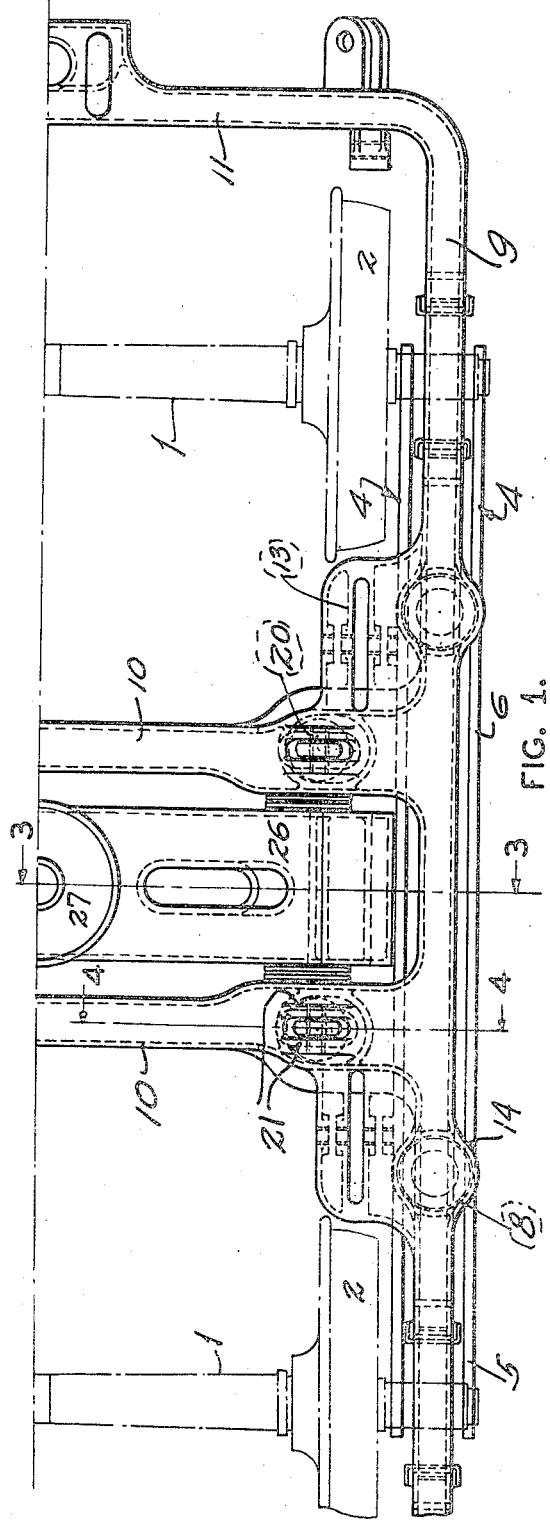
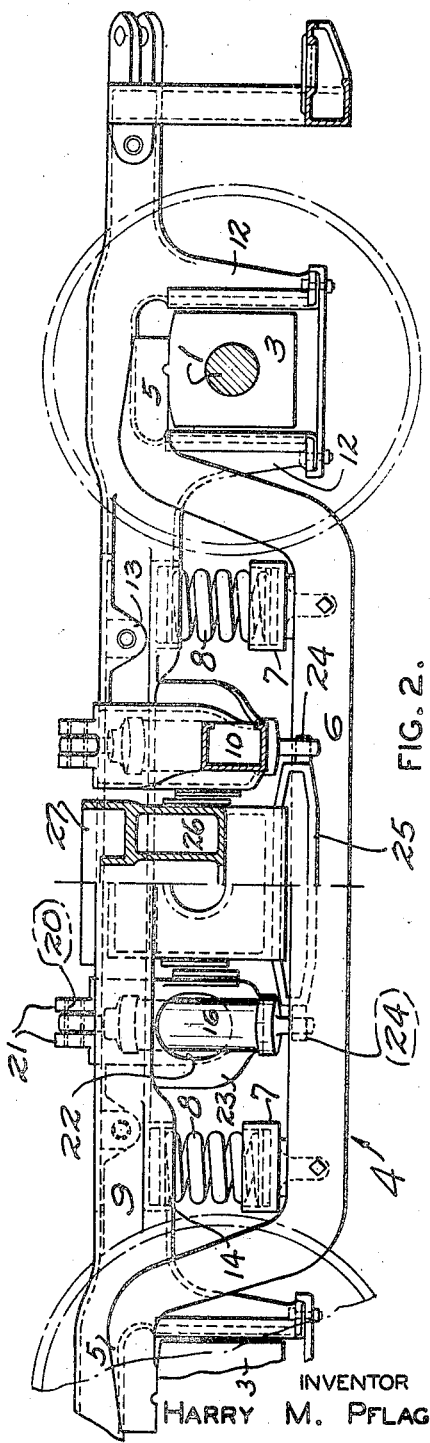
INVENTOR
HARRY M. PFLAGER
BY Rodney Bedell
ATTORNEY Nov. 19, 1940.  H. M. PFLAGER  2,222,321
RAILWAY TRUCK
Filed Oct. 15, 1938  2 Sheets-Sheet 2

INVENTOR
HARRY M. PFLAGER
BY *Rodney Bedell*
ATTORNEY

Patented Nov. 19, 1940

2,222,321

UNITED STATES PATENT OFFICE 2,222,321

RAILWAY TRUCK

Harry M. Pflager, St. Louis, Mo., assignor to General Steel Castings Corporation, Granite City, Ill., a corporation of Delaware Application October 15, 1938, Serial No. 235,161

10 Claims. (Cl. 105—190)

The invention relates to railway rolling stock and more particularly to trucks for use in passenger train equipment.

Due to increased speeds of passenger trains, it has become necessary to endeavor to control, to a greater extent than heretofore, vertical and lateral oscillations and vibrations of the truck bolster relative to the truck frame.

The main object of the invention is to obtain easier riding in railway vehicles. In attaining this general object it has been heretofore proposed to use combined swing hanger and shock absorber units for supporting the truck bolster from the truck frame.

It is an additional object of the present invention to utilize such units effectively and in such manner that a relatively light weight and simplified truck may be used.

Another object of the invention is to avoid the projection of such units beyond the sides of the truck where they are likely to be struck by rock, dirt, ice, or other debris from slides or from other reasons.

Another object of the invention is to distribute the weight on the track by means of such units more evenly than has been done heretofore.

These and other detailed objects referred to below are attained by the structure illustrated in the accompanying drawings, in which—

Figure 1 is a top view of one longitudinal half of a railway four-wheel truck.

Figure 2 is in part a side view and in part a vertical section on the longitudinal center line of the truck.

Figure 3:
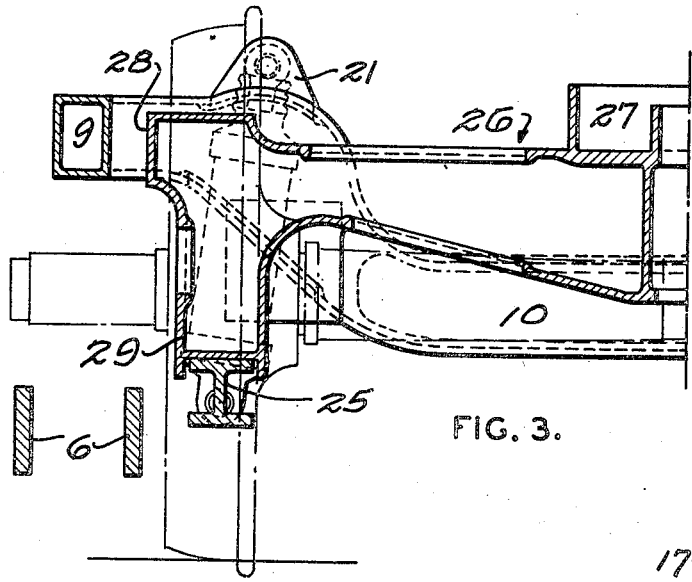
Figures 3 and 4 are vertical transverse sections on the corresponding section lines of Figure 1.
Figure 4:
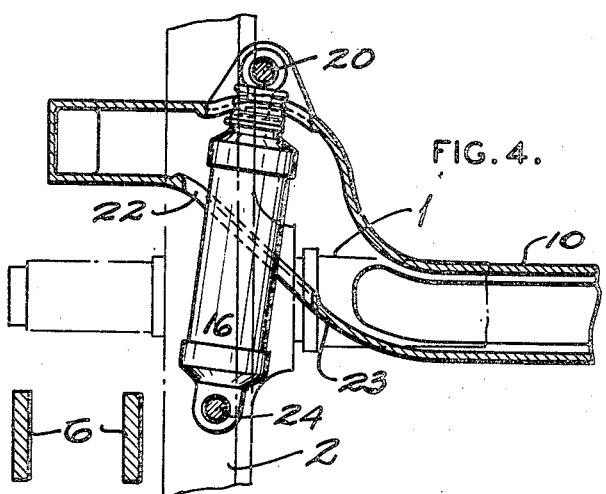

The truck includes the usual axles 1, wheels 2, and journal boxes 3. Double equalizer bars 4 extend between the journal boxes at one side of the truck and each includes an elevated end portion 5 resting on top of one of the journal boxes and an intermediate or middle portion 6 depressed below the end portions and extending approximately at the level of the bottoms of the journal boxes. Spring seats 7 are carried on depressed portions 6 of the equalizers and mount coiled springs 8.

The truck frame preferably comprises a single casting including box-shaped wheel pieces 9 and box-shaped transverse transoms 10, the side walls of the transoms merging in rounded sections with the inner walls of the wheel pieces. Between the truck side frames the transoms are depressed to a level approximating axles 1. The frame also includes end members 11, pedestal legs 12, brake hanger brackets 13, and spring cap elements 14 receiving the upper ends of springs 8.

Figure 6:
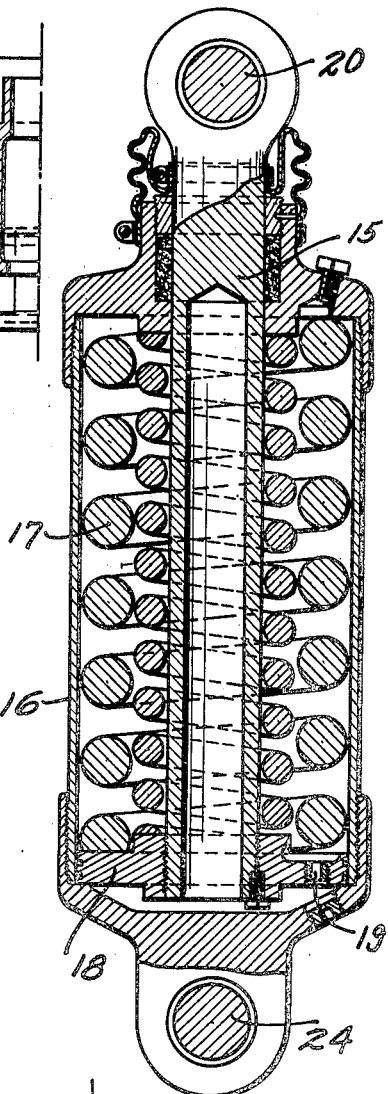
Figure 6 is an enlarged detail of one of the yielding suspension links and shock absorbing units utilized in the truck structure.

Suspended from each end of each transom 10 is a combined swing hanger and shock absorber and rebound snubber unit detailed in Figure 6 and including a central member 15 and an outer member 16. Coiled springs 17 are compressed between the upper end of the outer member and a collar 18 on the lower end of central member 15. Preferably the device also includes pneumatic or hydraulic shock absorbing structure, there being a restricted passage 19 in collar 18 providing for the passage of the fluid in member 16 to opposite sides of the collar. The detail construction of this unit does not constitute part of the present invention but it is illustrated and described briefly above to make clear the operation of the complete truck structure in which it forms a part.

Each shock absorbing unit is supported by a pin 20 passing through the upper end of member 15 and seated in upstanding ears 21 on the transom. The lower portion of each unit extends through an opening 22 provided therefor in the upwardly inclined lower wall 23 of the transom. The lower end of member 16 is apertured to receive a cylindrical element 24 provided on the end of a cross bar 25 extending between the units at the same side of the truck.

The truck bolster 26 preferably consists of a one-piece casting of box-shaped cross section and including a center plate 27 for receiving the body center plate, the ends 28 of the bolster body opposing and being spaced from the inner walls of the frame wheel pieces, there being depending arms 29 resting directly upon cross bars 25. Elements 25 and 29 and the lower ends of the shock absorbing units are located inwardly of the truck from the middle portions of equalizers 4.

Figure 5:
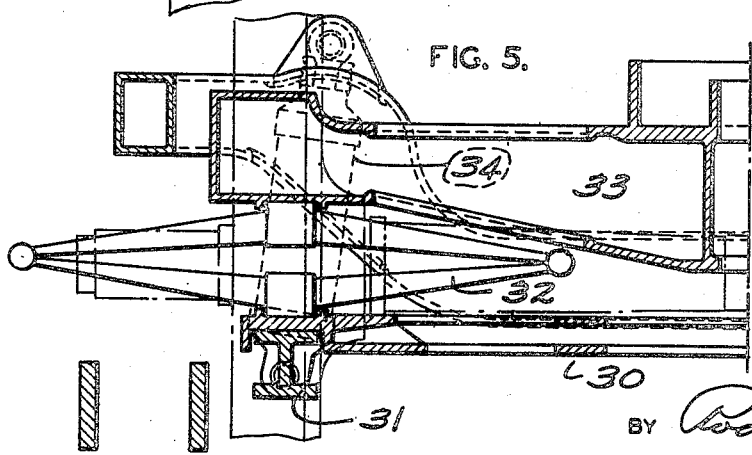
Figure 5 is a section corresponding to Figure 3 but illustrating a different form of the invention.

Figure 5 illustrates another arrangement in which a spring plank 30 is carried upon the cross bars 31 corresponding to cross bars 25 in the form previously described. Elliptic springs 32 are seated on the end portions of spring plank 30 and provide a yielding support for the bolster 33 in addition to the yielding support afforded by the shock absorber and rebound snubber units 34 corresponding to those previously described. Otherwise the truck structures are alike.

Both forms of the invention embody a simple and light truck construction because the bolster supporting units are suspended from the transoms instead of the wheel pieces, each wheel piece being a single substantially horizontal member extending from end to end of the truck and supported on springs positioned near to the ends of the transoms. By using the drop equalizers, ample room is provided adjacent to the ends of the bolster for the latter and for the support units although these units being spaced inwardly from the wheel pieces should not move into the vertical plane of the latter even when the bolster swings transversely of the truck. This position of the support units and the termination of the bolster between the truck wheel pieces makes possible the use of a short bolster and avoids the possibility of the ends of the bolster, or its swinging support structure, encountering rocks or other extraneous objects along the side of the track.

Where it is desired to obtain the additional yielding motion resulting from bolster springs, as illustrated in Figure 5, the same may be provided without shifting the relative position of the shock absorbing and rebound snubbing units, the only substantial difference in this structure being the redesign of the ends of the bolster and the addition of the spring plank and bolster springs.

Either of the structures shown could be embodied in a straight equalizer truck by modifying the frame wheel pieces and the truck spring structure without substantial changes in the positioning of the yielding swing hanger units. The changes suggested and other modifications may be incorporated in a structure embodying the invention, and the exclusive use of such modifications coming within the scope of the claims is contemplated.

What is claimed is:

1. In a railway truck, wheeled axles, axle boxes, equalizers resting upon and extending between said axle boxes, springs on said equalizers, a frame carried on said springs, units suspended from said frame at points on the latter inwardly of the truck from said equalizers and each comprising a yielding hanger structure and a rebound snubber, and a bolster carried directly by said units.

2. In a railway truck, wheeled axles, axle boxes, equalizers resting upon and extending between said axle boxes, springs on said equalizers, a frame carried on said springs and including wheel pieces and transverse transoms extending between said wheel pieces, combined shock absorbing and snubber rebound units suspended from said transoms at points spaced inwardly from said wheel pieces, and a bolster extending transversely of the truck and having end portions supported directly by the lower portions of said units inwardly of the truck from the adjacent parts of said equalizers and holding the lower portions of said units in spaced relation.

3. In a railway truck, wheeled axles, axle boxes, equalizers resting upon and extending between said axle boxes, springs on said equalizers, a frame carried on said springs and including wheel pieces and transverse transoms extending between said wheel pieces, a pair of combined shock absorbing and snubber rebound units suspended from each of said transoms and located between the wheel pieces and between the equalizers at opposite sides of the truck, a cross bar between the lower ends of each pair of units, and a bolster having an elevated, body-supporting center portion and depending end portions resting directly on said cross bars and holding the said units in spaced relation.

4. In a railway truck, wheeled axles, axle boxes, equalizers resting upon and extending between said axle boxes, springs on said equalizers, a frame carried on said springs and including wheel pieces and spaced transverse transoms extending between said wheel pieces and depressed below the level of said wheel pieces but having their end portions inclined upwardly and merging with said wheel pieces, each of said transoms having a bottom wall and spaced side walls, yielding hanger and rebound snubber suspension units pivotally suspended from the upper end portions of said transoms and inwardly of the truck frames from said wheel pieces and each positioned between the side walls of the corresponding transom and extending downwardly and outwardly through openings provided therefor in the inclined bottom wall of said transom with the lower ends of said units disposed to clear said equalizers, and a bolster carried directly by said units.

5. A truck as described in claim 4 in which the equalizers are of the depressed type with their portions intermediate the journal boxes being located at a substantially lower level than the portions over the journal box and the lower ends of the suspension units being positioned inwardly of the truck from the intermediate portions of the equalizers so as to clear the same when swinging laterally of the truck.

6. In a railway truck, wheeled axles, axle boxes, equalizers resting upon and extending between said axle boxes, springs on said equalizers, a frame carried on said springs and including sides and transverse transoms, each side consisting of a single wheel piece extending substantially horizontally from end to end of the truck at a level above the tops of said axle boxes, combined yielding hanger and rebound snubber units pivotally suspended from said transoms with their lower ends terminating a substantial distance below the level of said wheel pieces, and a bolster supported directly and solely on the lower portions of said units and constructed and arranged for movement laterally of the truck upon swinging of said units and clearing said equalizers in such lateral movement.

7. In a railway truck, wheeled axles, axle boxes, equalizers resting upon and extending between said axle boxes, the middle portions of said equalizers being depressed to a level approximating that of the bottoms of the journal boxes, springs on said equalizers, a frame carried on said springs and including sides and transverse transoms each side consisting of a single wheel piece extending substantially horizontally from end to end of the truck at a level above the tops of said axle boxes and spaced a substantial distance above said equalizer middle portions, combined yielding hanger and rebound snubber units pivotally suspended from said transoms with their lower ends terminating a substantial distance below the level of said wheel pieces, and a bolster supported directly and solely on the lower portions of said units, the lower portions of said units being located inwardly of the truck from said equalizers and the ends of said bolsters being located inwardly of the truck from said wheel pieces.

8. In a railway truck, wheeled axles, axle boxes, equalizers resting upon and extending between said axle boxes, springs on said equalizers, a frame carried on said springs, units spaced apart longitudinally of the truck and suspended from said frame at points on the latter inwardly of the truck from said equalizers and each comprising a yielding hanger structure and a rebound snubber, a bar extending between said units, and a bolster structure having a support on said bar elongated lengthwise of the same to hold said bolster structure against tilting relative to said units and other truck parts in a vertical plane extending longitudinally of the truck.

9. A railway truck as described in claim 8 in which the bolster structure support and the unit carried bar includes springs cooperating with the suspension units to yieldingly transmit forces between the truck frame and bolster structure.

10. A railway truck as described in claim 8 in which the bolster structure support and the unit carried bar includes springs cooperating with the suspension units to yieldingly transmit forces between the truck frame and bolster structure, there being a tie extending transversely of the truck between the bars at opposite sides of the truck to hold said springs and the lower portions of said units against relative movement transversely of the truck.

H. M. PFLAGER.